United States Patent
Jeon et al.

(10) Patent No.: US 11,873,561 B2
(45) Date of Patent: Jan. 16, 2024

(54) METHOD FOR PRODUCING HOT-DIP GALVANIZED STEEL SHEET HAVING EXCELLENT PRESS FORMABILITY AND IMAGE CLARITY AFTER PAINTING, AND HOT-DIP GALVANIZED STEEL SHEET PRODUCED THEREBY

(71) Applicant: POSCO, Pohang-si (KR)

(72) Inventors: Sun-Ho Jeon, Gwangyang-si (KR); Moon-Hi Hong, Gwangyang-si (KR); Jun-Seok Park, Gwangyang-si (KR); Doo-Chan Chang, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 985 days.

(21) Appl. No.: 16/468,494

(22) PCT Filed: Dec. 13, 2017

(86) PCT No.: PCT/KR2017/014638
§ 371 (c)(1),
(2) Date: Jun. 11, 2019

(87) PCT Pub. No.: WO2018/110972
PCT Pub. Date: Jun. 21, 2018

(65) Prior Publication Data
US 2020/0071809 A1  Mar. 5, 2020

(30) Foreign Application Priority Data
Dec. 14, 2016 (KR) .................. 10-2016-0170339

(51) Int. Cl.
*C23C 2/40* (2006.01)
*C23C 2/06* (2006.01)
(Continued)

(52) U.S. Cl.
CPC .............. *C23C 2/40* (2013.01); *B21B 1/227* (2013.01); *B21B 27/005* (2013.01);
(Continued)

(58) Field of Classification Search
None
See application file for complete search history.

(56) References Cited

U.S. PATENT DOCUMENTS

| | | | |
|---|---|---|---|
| 5,629,099 | A | 5/1997 | Sakurai et al. |
| 2003/0012978 | A1 | 1/2003 | Sodani et al. |

(Continued)

FOREIGN PATENT DOCUMENTS

| | | |
|---|---|---|
| EP | 1466994 | 10/2004 |
| JP | 05015901 | 1/1993 |

(Continued)

OTHER PUBLICATIONS

KR101677390B1, English language translation from EPO dated Mar. 21, 2022. (Year: 2022).*

(Continued)

*Primary Examiner* — Xiaobei Wang
(74) *Attorney, Agent, or Firm* — CANTOR COLBURN LLP

(57) ABSTRACT

Provided is a hot-dip galvanized steel sheet used for an automobile outer panel and so forth and, more specifically, to a method for producing a hot-dip galvanized steel sheet having excellent press formability and clarity after painting, and to a hot-dip galvanized steel sheet produced by the method.

2 Claims, 3 Drawing Sheets

(51) Int. Cl.
    *C23C 2/26*     (2006.01)
    *B32B 15/01*     (2006.01)
    *B21B 1/22*     (2006.01)
    *B21B 27/00*     (2006.01)
    *B21B 27/02*     (2006.01)

(52) U.S. Cl.
    CPC ............ *B21B 27/021* (2013.01); *B32B 15/01* (2013.01); *C23C 2/06* (2013.01); *C23C 2/26* (2013.01); *B21B 2001/228* (2013.01); *Y10T 428/12993* (2015.01)

(56) References Cited

U.S. PATENT DOCUMENTS

| | | | |
|---|---|---|---|
| 2011/0111255 A1 | 5/2011 | Diez et al. | |
| 2015/0209848 A1* | 7/2015 | Kopplin | B23K 26/0823 428/659 |
| 2016/0002763 A1 | 1/2016 | Diez et al. | |
| 2018/0345339 A1* | 12/2018 | Jeon | B32B 15/012 |

FOREIGN PATENT DOCUMENTS

| | | |
|---|---|---|
| JP | 06075728 | 9/1994 |
| JP | 07009015 | 1/1995 |
| JP | 07136701 | 5/1995 |
| JP | 10152756 | 6/1998 |
| JP | 11302816 | 11/1999 |
| JP | 2001323358 | 11/2001 |
| JP | 2002004019 | 1/2002 |
| JP | 2002266062 | 9/2002 |
| JP | 2003268519 | 9/2003 |
| JP | 2010530028 | 9/2010 |
| JP | 2015527203 | 9/2015 |
| KR | 20020068525 | 8/2002 |
| KR | 100868457 | 11/2008 |
| KR | 20150072806 | 6/2015 |
| KR | 20160036139 | 4/2016 |
| KR | 101677390 | 11/2016 |
| WO | 9501462 | 1/1995 |
| WO | 2008147010 | 12/2008 |
| WO | 2014037545 | 3/2014 |

OTHER PUBLICATIONS

European Search Report—European Application No. 17880473.8 dated Aug. 30, 2019, citing KR 101 677 390, US 2015/209848, EP 1 466 994, US 2016/002763 and US 2011/111255.
Japanese Office Action—Japanese Application No. 2019-531475 dated Oct. 19, 2021, citing KR 10-1677390, Veeco Metrology Group, JP 2001-323358, JP 2015-527203, JP 2010-530028, JP H07-136701, JP 2003-268519, and JP 2002-266062.
WYKO Surface Profilers Technical Reference Manual, Veeco Metrology Group, Sep. 1999, Version 2.2.1, pp. 3-9~3-10.
International Search Report—PCT/KR2017/014638 dated Mar. 20, 2018.
Japanese Office Action—Japanese Application No. 2019-531475 dated Aug. 18, 2020, citing JP 2001-323358, US 2018/0345339, KR 10-1677390, JP 2015-527203, JP 2010-530028, JP H07-136701, JP 2003-268519, and JP 2002-266062.

* cited by examiner

METHOD FOR PRODUCING HOT-DIP GALVANIZED STEEL SHEET HAVING EXCELLENT PRESS FORMABILITY AND IMAGE CLARITY AFTER PAINTING, AND HOT-DIP GALVANIZED STEEL SHEET PRODUCED THEREBY

TECHNICAL FIELD

The present disclosure relates to a hot-dip galvanized steel sheet used for an outer panel of a vehicle, and the like, and more particularly, a method of manufacturing a hot-dip galvanized steel sheet having excellent press formability and image clarity after painting, and a hot-dip galvanized steel sheet manufactured by the method.

BACKGROUND ART

A plated steel sheet, particularly a hot-dip galvanized steel sheet (GI), has excellent corrosion resistance, weldability, and paintability, such that a hot-dip galvanized steel sheet may be widely used as a steel sheet for an outer panel of a vehicle. Accordingly, excellent press formability and also image clarity after painting have been required.

Differently from a galvannealed steel sheet (GA) on a surface of which fine ruggedness are formed during an alloying process, a coating layer of a hot-dip galvanized steel sheet may be formed of pure zinc (an eta phase, a η phase). Accordingly, a surface after coating may be smooth, and a coating film may be soft, such that a galling phenomenon, the separation of a coating layer, may easily occur due to cohesion between the coating layer and a press die, which may be a disadvantage.

Galling may refer to a phenomenon in which, when a portion of a coating layer peels off and is cold-press welded to a surface of the die, and a new material is consecutively formed, scratches or dents may be created on a surface of the material, or the coating layer cold-press welded to a surface of the die may peel off due to friction with the material during forming, such that a portion of a die material may peel off together.

As such, the galling occurring during press-forming of a hot-dip galvanized steel sheet may greatly affect surface quality of a press-formed product using a plated steel sheet as a material and a lifespan of a die, and may thus be a cause of increased costs in a pressing process.

Further, a hot-dip galvanized steel sheet may be painted after being processed to form a vehicle component, and the like, and a surface of the hot-dip galvanized steel sheet may have surface unevenness such as dents, grain or surface ruggednesses, by the formation of spangles, solidification structures of zinc. Accordingly, such unevenness may remain, even after painting, such that when an object is reflected on a painted surface, an image may be distorted, and image clarity after painting may degrade.

As factors affecting image clarity after painting, there may be a material factor, such as orange peel defects, dent defects, and the like, of a hot-dip galvanized steel sheet, a painted material, and a painting factor, such as paint, painting conditions, and the like.

Recently, with the groundbreaking advancement of painting and paint techniques, automobile companies have actively pushed the application of a 2-coat painting system in which an intermediate painting process, a primer painting process, is omitted from a conventional 3-coat painting system, including a lower painting process, an electrostatic painting process, an intermediate painting process, a primer painting process, and an upper painting process, a base coating process and a clear coating process to lower costs.

However, the purpose of the primer painting process is to control surface unevenness such as ruggednesses, orange peel defects, and the like, present on a surface of a hot-dip galvanized steel sheet to be painted. As the primer process is omitted, an overall thickness of a painting system may greatly decrease, and the function of the primer painting process may not be implemented, such that there may be a risk in which unevenness of the hot-dip galvanized steel sheet may be exposed as it is after painting.

Thus, in accordance with the trend of application of the 2-coat painting system without a primer process, stricter surface quality of a hot-dip galvanized steel sheet, a painted material, has been required.

As described above, to use a hot-dip galvanized steel sheet as an outer panel of vehicles, both press formability and image clarity after painting have been required. However, prior art inventions have responded to the requirement with an individual technique as below.

For example, reference 1 discloses that press formability of a hot-dip galvanized steel sheet may improve by controlling a sum of volumes of concave portions in every unit area of a hot-dip galvanized steel sheet to be 0.0001 to 0.01 mm2 by rolling using a skin pass roll having regular ruggednesses formed through a Laser Texturing process.

As techniques for improving image clarity after painting of a hot-dip galvanized steel sheet, there may be references 2 to 4. Reference 2 is the technique of adjusting average surface roughness (Ra) to be 0.3 to 3 μm, the number of peaks (PPI) to be 250/inch or higher (in the case of RPc, 98 count/cm or higher), and average waviness (Wca) to be 0.8 μm by projecting solid grains on a surface of a hot-dip galvanized steel sheet. Reference 3 and reference 4 disclose a method of controlling average surface roughness (Ra), the number of peaks in each unit length (RPc), and average waviness (Wca) of a plated steel sheet skin-pass-rolled using a roll of which roughness and waviness are regulated, and in reference 3, the roll is processed as above using a Laser Texturing process (LT), and in reference 4, the roll is processed using an electron beam texturing process (EBT).

However, in reference 1, even when a sum of volumes of concave portions in every unit area of a hot-dip galvanized steel sheet is controlled to be a constant value or higher, an amount of oil retentation and friction properties may appear depending on a form of surface ruggednesses, and accordingly, a significantly different galling behavior may appear during press forming. Also, as for references 2 to 4, even when a form profile of a hot-dip galvanized steel sheet caused by roughness endowed in a skin pass roll is removed by various methods, a form profile of a matrix original sheet remaining on a coating layer may appear again after press-forming, and may remain as is, even after painting, which may cause the problem of deterioration of image clarity after painting.

PRIOR ART

Reference (Reference 1) Japanese Laid-Open Patent Publication No. 1995-136701
(Reference 2) Korean Laid-Open Patent Publication No. 2002-0068525
(Reference 3) Japanese Laid-Open Patent Publication No. 1994-75728

(Reference 4) Japanese Laid-Open Patent Publication No. 1999-302816

DISCLOSURE

Technical Problem

An aspect of the present disclosure is to provide a method for improving press formability and image clarity after painting of a hot-dip galvanized steel sheet in which a painting defect does not occur after painting, and also the galling caused by reduced friction during press-forming does not occur, and a hot-dip galvanized steel sheet having excellent press formability and image clarity after painting, manufactured by the method.

However, aspects of the present disclosure are not limited thereto. Additional aspects will be set forth in part in the description which follows, and will be apparent from the description to those of ordinary skill in the related art.

Technical Solution

According to an aspect of the present disclosure, a method of manufacturing a hot-dip galvanized steel sheet having excellent press formability and image clarity after painting may be provided, the method comprising, manufacturing a hot-dip galvanized steel sheet by hot-dip zinc coating a matrix steel sheet; and charging the hot-dip galvanized steel sheet in a skin-pass mill and skin-pass-rolling the hot-dip galvanized steel sheet, and the skin-pass-rolling uses a roll having roughness skewness (Rsk) of −0.2 or lower, an average roughness (Ra) of 2 μm or less, excluding 0, and a number of peaks (RPc) in each unit length of 140 count/cm or higher. As a roll satisfying the above-described conditions, there may be a super finishing roll.

According to another aspect of the present disclosure, a hot-dip galvanized steel sheet having excellent press formability and image clarity after painting and manufactured by the aforementioned method may be provided, the hot-dip galvanized steel sheet comprising, a matrix steel sheet and a hot-dip galvanized layer formed on the matrix steel sheet, and the hot-dip galvanized steel sheet has roughness skewness (Rsk) or −0.33 or higher, and a lubricant filled profile valley area (V2) of 350 nm or greater.

Advantageous Effects

According to an aspect of the present disclosure, by effectively reducing sliding friction resistance with a press die during press-forming, a hot-dip galvanized steel sheet which may prevent the galling in which a coating layer is separated in the middle of press-forming may be provided, which may be an effect of the present disclosure.

Also, a hot-dip galvanized steel sheet having excellent image clarity after painting in which painting defects such as orange peel does not occur after painting may be provided, which may be another effect of the present disclosure.

BEST MODE FOR INVENTION

The inventors have conducted research on a measure for satisfying press formability and image clarity after painting at the same time, properties required for a hot-dip galvanized steel sheet used for an outer panel of vehicles. As a result, it has been found that press formability and image clarity after painting may be closely related to skin-pass-rolling.

Accordingly, while changing a form of a skin-pass roll and roughness and operational conditions of the roll, a form and a size of a surface indentation, and the like, of a hot-dip galvanized steel sheet, a Wsa1-5 value, long-wavelength waviness after 5%-forming, which is a factor relevant to image clarity after painting of a hot-dip galvanized steel sheet, and the behavior of a repetitive friction coefficient, which is a factor relevant to press-formability (galling properties) have been specifically examined.

Figure 1:
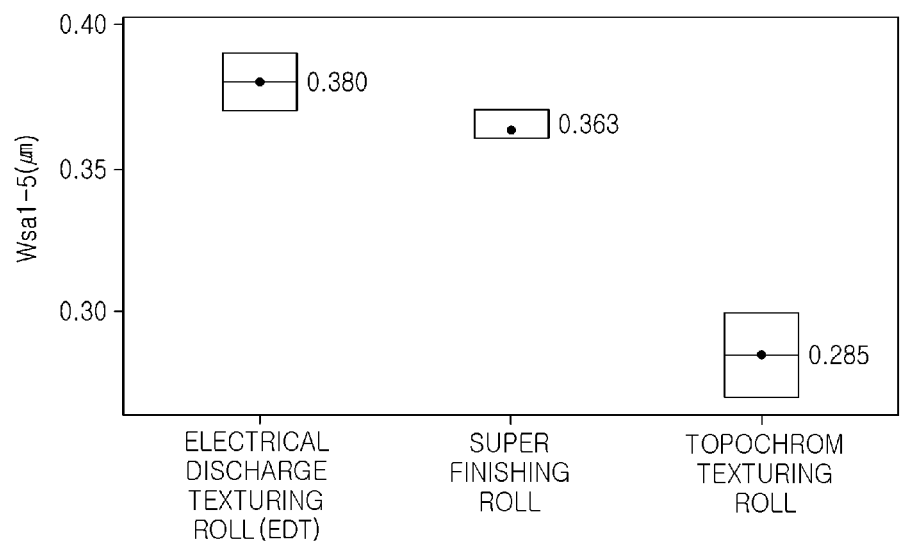
FIG. 1 is a result of measurement of long-wavelength waviness (Wsa1-5) of a hot-dip galvanized steel sheet after 5%-forming in accordance with a method of endowing roughness of a roll used in skin-pass-rolling.
Figure 2:
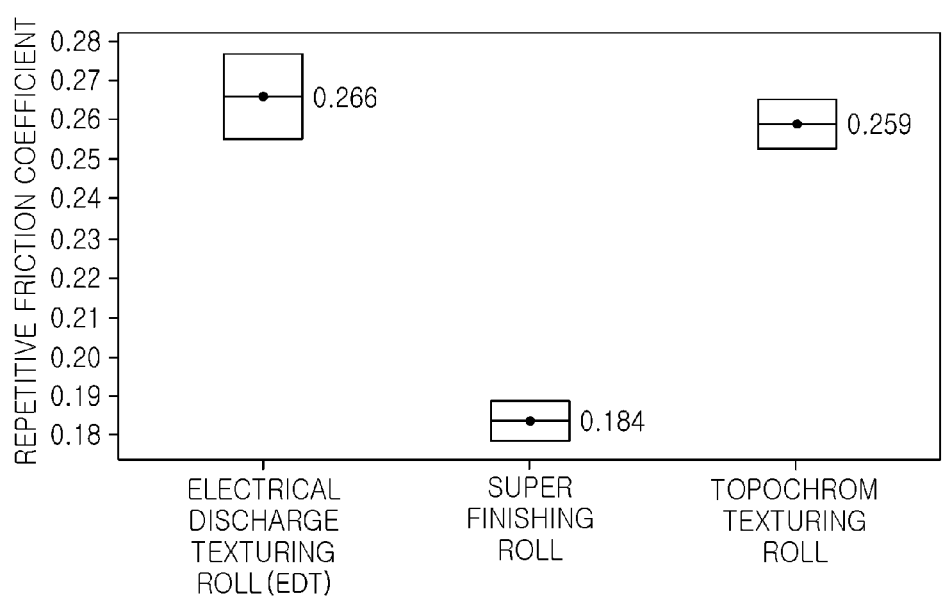
FIG. 2 is a result of measurement of a repetitive friction coefficient of a hot-dip galvanized steel sheet in accordance with a method of endowing roughness of a roll used in skin-pass-rolling.

As a result, as indicated in FIGS. 1 and 2, the behaviors of the long-wavelength waviness (Wsa1-5) value and the repetitive friction coefficient appeared differently after 5%-forming of a hot-dip galvanized steel sheet skin-pass-rolled in accordance with a method of endowing roughness of a skin pass roll having roll average roughness (Ra) of 2.8 μm. In other words, as for a Wsa1-5 value, a hot-dip galvanized steel sheet skin-pass-rolled using a TOPOCHROM texturing (TCT) roll in which roughness are endowed on a surface of the roll in embossed form using a chrome-plating process had a smaller Wsa1-5 value than that of a hot-dip galvanized steel sheet skin-pass-rolled using an electrical discharge texturing (EDT) roll in which roughness was endowed on a surface of the roll by electro-discharging and a roll obtained by grinding peak portions of fine ruggednesses of the EDT roll, and thus, the former hot-dip galvanized steel sheet had more improved image clarity after painting. However, as for a repetitive friction coefficient, a hot-dip galvanized steel sheet skin-pass-rolled using a roll in which peak portions were ground had a smaller repetitive friction coefficient than that of a hot-dip galvanized steel sheet skin-pass-rolled using a TCT roll or a EDT roll, and thus had more improved press formability.

Particularly, as indicated in FIG. 2, it was not possible to manage a repetitive friction coefficient of the hot-dip galvanized steel sheet skin-pass-rolled using a TCT roll or a EDT roll to be 0.2 or less in which the galling did not occur even when process conditions and operational conditions of each roll were adjusted.

As for the roll in which peak portions were ground, it has been found that it was possible to secure image clarity after painting and galling properties at the same time by adjusting a level of grinding peak portions of fine ruggednesses and adjusting roughness.

Thus, the present disclosure may suggest a measure for securing excellent press formability and also excellent image clarity after painting while increasing V2, a lubricant filled profile valley area in which lubricant may remain, by adjusting roughness skewness (Rsk) of a hot-dip galvanized steel sheet by controlling a roll used in skin-pass-rolling of the hot-dip galvanized steel sheet, and also by controlling a long-wavelength waviness (Wsa1-5) value.

The roughness skewness (Rsk), a roughness form factor representing a size or a shape of a peak and a valley of fine ruggednesses (roughness) may indicate a ratio between a height of a peak and a depth of a valley (a height of a peak/a depth of a valley). Accordingly, when the value is positive (+), a height of a peak may be greater than a depth of a valley, whereas the value is negative (−), a height of a peak may be smaller than a depth of a valley.

Also, the V2 (lubricant filled profile valley area) is a form factor which indicates a profile area of fine ruggednesses in which oil, such as a lubricant, or the like, may remain.

Also, the number 1 and 5 of Wsa1-5 (SEP1941 standard) indicating long-wavelength waviness may indicate a lower limit and an upper limit of a cut-off value, respectively. "1" is a roughness cut-off value (λc) which removes a roughness element having a wavelength of 1 mm or less in a form profile, and "5" is a coarse form cut-off value (λf) which removes a coarse form of 5 mm or greater in a form profile. Thus, only pure long-wavelength waviness, in which a roughness element covered by a painting film after painting, and a coarse form which has not been observed due to an orange peel defect, and the like, as the form is coarse, in a form profile were removed, was represented.

In the description below, the present disclosure will be described in detail.

A method of manufacturing a hot-dip galvanized steel sheet having excellent press formability and image clarity after painting according to an aspect of the present disclosure may include manufacturing a hot-dip galvanized steel sheet by hot-dip zinc coating a matrix steel sheet, and charging the hot-dip galvanized steel sheet in a skin-pass mill and skin-pass-rolling the hot-dip galvanized steel sheet preferably.

In manufacturing the hot-dip galvanized steel sheet according to the present disclosure, it may be preferable to hot-dip zinc plate the matrix steel sheet, and as a coating condition, general hot-dip zinc coating conditions may be applied, and may not be particularly limited.

A steel sheet which may be used as the matrix steel sheet may not be particularly limited. Any steel sheet which may manufacture a hot-dip galvanized steel sheet may be used, and may be a cold-rolled steel sheet preferably.

The hot-dip galvanized steel sheet manufactured as above may be charged to a general skin pass mill and may be skin-pass-rolled. In the present disclosure, it may be preferable to perform the skin-pass-rolling by controlling a form factor of a roll used during the skin-pass-rolling.

The skin-pass-rolling process may be an important process for achieving an ultimate purpose of the present disclosure. By optimizing skin-pass-rolling conditions as described below, a hot-dip galvanized steel sheet having improved press formability and image clarity after painting may be finally manufactured.

Particularly, to implement a hot-dip galvanized steel sheet having excellent press formability and image clarity after painting targeted in the present disclosure, it may be preferable to use a roll obtained by grinding peak portions of fine ruggednesses of an electrical discharge texturing roll during the skin-pass-rolling. In an embodiment of the present disclosure, a super finishing roll in which peak portions of the fine ruggednesses are ground may be used.

In a general TOPOCHROM texturing roll, an electrical discharge texturing roll, and the like, a size of a peak and a size of a valley of fine ruggednesses may be similar to each other, or a height of a peak may be greater, and thus, roughness skewness may have a positive (+) value. When the skin-pass-rolling is performed using such a roll, roughness skewness of fine ruggednesses of indentation reflected on a surface of the hot-dip galvanized steel sheet may have a negative (−) value. In this case, a V2 (lubricant filled profile valley area) value representing a retentation of lubricant of a surface of the hot-dip galvanized steel sheet, a lubricant filled profile valley area in which lubricant may remain, may decrease.

In the case of the roll according to an example embodiment of the present disclosure, as peak portions of fine ruggednesses of an electrical discharge texturing roll are removed, roughness skewness (Rsk) of the roll may have a negative (−) value, and when the hot-dip galvanized steel sheet is skin-pass-rolled using the roll, roughness skewness (Rsk) of fine ruggednesses of indentation reflected on a surface of the steel sheet may have a positive (+) value, or may have a negative (−) value higher than the roughness skewness value of the skin pass roll (which indicates that, when roughness skewness of the skin pass roll is −0.3, roughness skewness of the steel sheet may be −0.2 or −0.1, for example). Accordingly, the V2 representing a lubricant storage may increase, and a repetitive friction coefficient ($\mu$=friction force/weight) may decrease due to the lubricating action during press-forming such that the galling may not occur.

More specifically, the roll according to an embodiment of the present disclosure may have roughness skewness (Rsk) of −0.2 or less, average roughness (Ra) of 2 μm or less (excluding 0), and the number of peaks (RPc) in each unit length of 140 count/cm or higher preferably.

When roughness skewness (Rsk) of the roll exceeds −0.2, fine ruggednesses of the skin pass roll may not be sufficiently reflected on a surface of the hot-dip galvanized steel sheet such that it may not be possible to secure −0.33 or higher of a roughness skewness (Rsk) value of the hot-dip galvanized steel sheet.

Figure 3:
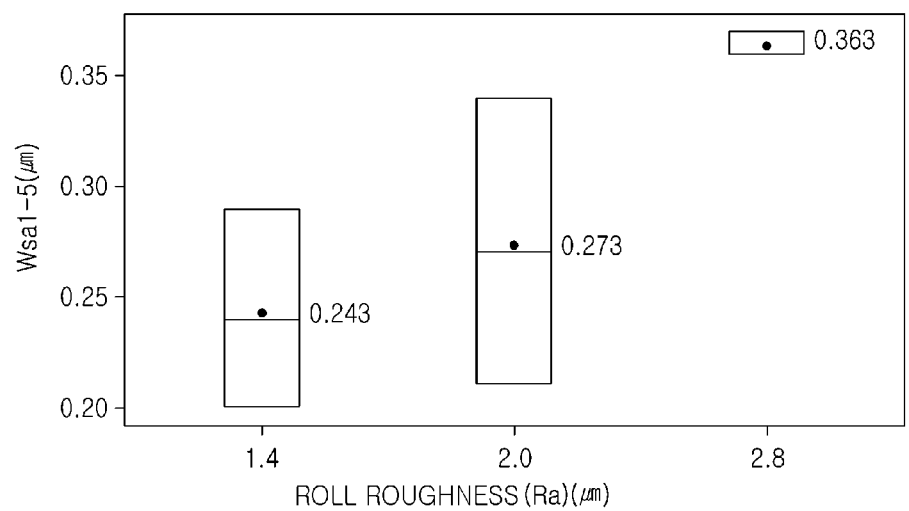
FIG. 3 is a result of measurement of long-wavelength waviness (Wsa1-5) of a hot-dip galvanized steel sheet after 5%-forming in accordance with a value of average roughness (Ra) of a roll.
Figure 4:
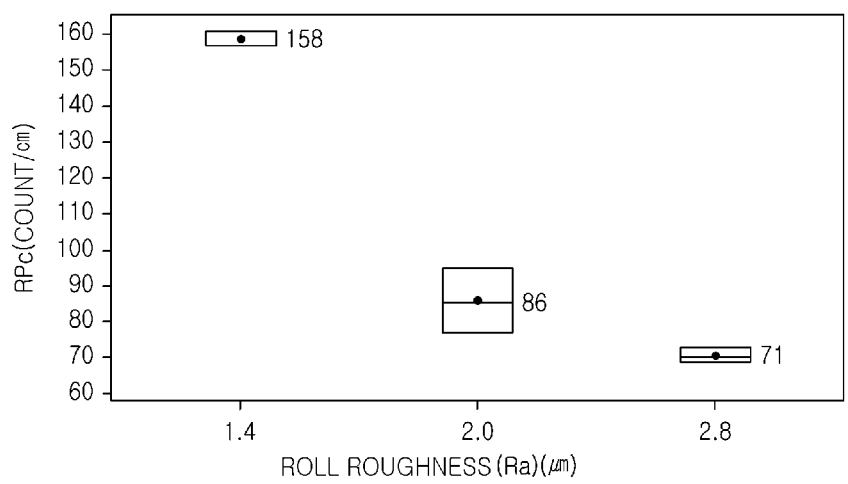
FIG. 4 is a result of measurement of the number of peaks (RPc) in each unit length of a hot-dip galvanized steel sheet in accordance with a value of average roughness (Ra) of a roll.

Also, when average roughness (Ra) of the roll exceeds 2 μm, it may not be possible to secure intended levels of long-wavelength waviness (Wsa1-5) and the number of peaks (RPc) in each unit length of the hot-dip galvanized steel sheet such that image clarity after painting may degrade (FIGS. 3 and 4).

Also, when the number of peaks in each unit length is lower than 140 count/cm, image clarity after painting may be deteriorated, which may not be preferable.

In the present disclosure, by performing the skin-pass-rolling using the roll of which roughness skewness, average roughness, and number of peaks (RPc) in each unit length are controlled, a hot-dip galvanized steel sheet having roughness skewness (Rsk) of −0.33 or higher and a lubricant filled profile valley area (V2) of 350 nm or greater may be obtained. Also, when the hot-dip galvanized steel sheet is processed under a strain rate of 5% in consideration of a maximum process rate of an outer panel of vehicles, surface long-wavelength waviness (Wsa1-5) of 0.35 μm or lower, and the number of peaks (RPc) in each unit length of 75 count/cm or higher may be obtained.

Particularly, by using the roll of which form factors are controlled as above, image clarity after painting of the hot-dip galvanized steel sheet may effectively improve.

In other words, even when average roughness of skin pass rolls are the same, when the roll of which form factors are controlled in accordance with an example embodiment of the present disclosure, an indentation area may increase such that long wavelength waves (waviness) such as a spangle grain boundary and waves of a coating layer which affect image clarity after painting may be greatly removed. That is because, the lower the average roughness of the roll according to an example embodiment of the present disclosure may be, RPc of the roll and the hot-dip galvanized steel sheet may more rapidly increase such that a spangle grain boundary, waves, and the like, of a coating layer may be effectively removed. Accordingly, long wavelength waves, and the like, may not be reappeared after processing, and image clarity after painting may thus improve.

In the description below, a hot-dip galvanized steel sheet having excellent press formability and image clarity after painting, another aspect of the present disclosure, will be described in detail.

A hot-dip galvanized steel sheet according to the present disclosure may include a matrix steel sheet and a hot-dip galvanized layer formed on the matrix steel sheet, and may have roughness skewness (Rsk) of −0.33 or higher, and a lubricant filled profile valley area (V2) of 350 nm or greater preferably.

The hot-dip galvanized steel sheet of the present disclosure described above may be manufactured by the aforementioned manufacturing method described according to the present disclosure, and particularly, by using a roll having roughness skewness (Rsk) of −0.2 or lower, average roughness (Ra) of 2 μm or less, and the number of peaks (RPc) in each unit length of 140 count/cm or higher during skin-pass-rolling, a hot-dip galvanized steel sheet having excellent press formability which may have roughness skewness (Rsk) of −0.33 or higher, and a lubricant filled profile valley area (V2) of 350 nm or greater may be obtained.

Accordingly, the hot-dip galvanized steel sheet of the present disclosure may have a low repetitive friction coefficient of 0.2 or lower with a press die as the lubricating action may be smoothly performed during press-forming, and consequently, a hot-dip galvanized steel sheet in which the galling phenomenon occurring during press-forming of a conventional plated steel sheet used for an outer panel of vehicles is resolved may be provided, which may be an effect of the present disclosure.

Figure 5:
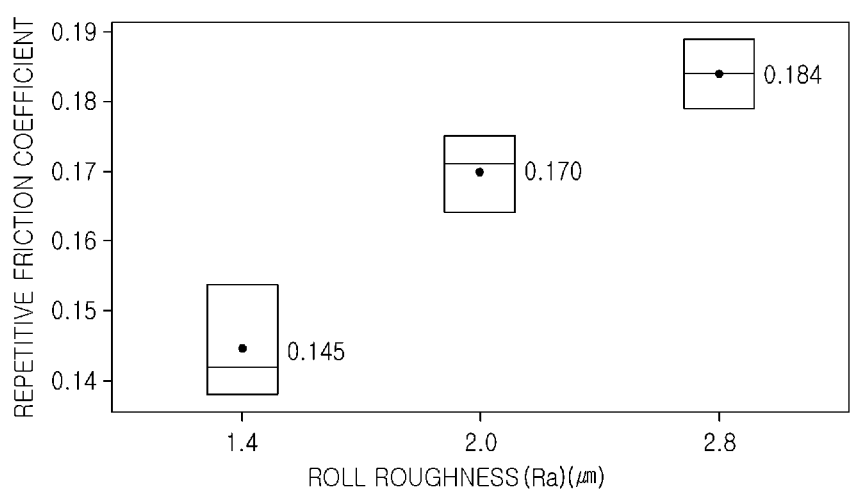
FIG. 5 is a result of measurement of a repetitive friction coefficient of a hot-dip galvanized steel sheet in accordance with a value of average roughness (Ra) of a roll.

More specifically, as indicated in FIG. 5, a repetitive friction coefficient may proportionally decrease as average roughness (Ra) of the roll decreases. That is because, as roughness of the roll decreases, roughness skewness (Rsk) of the hot-dip galvanized steel sheet changes from a negative (−) value to a positive (+) value, and a V2 value affecting the lubricating action during press-forming proportionally increases.

Also, when the hot-dip galvanized steel sheet of which roughness skewness is controlled is process at a strain rate of 5%, surface long-wavelength waviness (Wsa1-5) of 0.35 μm or less (excluding 0), and the number of peaks (RPc) in each unit length of 75 count/cm or higher may be secured such that excellent image clarity after painting may be secured.

MODE FOR INVENTION

In the description below, an example embodiment of the present disclosure will be described in greater detail. It should be noted that the exemplary embodiments are provided to describe the present disclosure in greater detail, and to not limit the present disclosure. The scope of right of the present disclosure may be determined based on the matters recited in the claims and the matters rationally inferred therefrom.

Embodiment

As a matrix steel sheet, a cold-rolled steel sheet having an element composition of 0.002% of C, 0.003% of Si, 0.08% of Mn, 0.028% of Al, 0.0114% of P, and 0.0052% of S (weight %) was prepared, and a hot-dip zinc coating process was performed on the cold-rolled steel sheet for a coating amount of one surface of the cold-rolled steel sheet to be 60 g/m$^2$, thereby obtaining a hot-dip galvanized steel sheet.

Thereafter, the hot-dip galvanized steel sheet was skin-pass-rolled using a skin-pass-rolling work roll having average roughness (Ra) of 1.4 to 2.8 μm, the number of peaks (RPc) in each unit length of 114 to 175 count/cm, and roughness skewness (Rsk) of −0.524 to 0.176 under roll reduction force of 250 tons, and fine ruggednesses were reflected on a surface of the hot-dip galvanized steel sheet. As the work roll, one of a TOPOCHROM texturing roll, an electrical discharge texturing roll, or a roll obtained by grinding peak portions of the electrical discharge texturing roll was selected and used.

The roughness value and the waviness value of fine ruggednesses of a surface of the hot-dip galvanized steel sheet skin-pass-rolled as above, such as average roughness (Ra), the number of peaks (RPc) in each unit length, and long-wavelength waviness (Wsa1-5), and the like, were measured in accordance with the SEP1941 standard using a contact-type roughness tester (of HOSAKAWA). Also, form factors such as roughness skewness (Rsk), V2, and the like, were measured using a surface roughness tester (of Veeco, NT8000).

As for a retentation of oil of the hot-dip galvanized steel sheet, a sample of the steel sheet was cut in a size of 30×30 mm, the cut-out sample was degreased and dried, a basis weight thereof was obtained, and the sample was submerged in lubricant (P-340N). Thereafter, 15 samples were compiled and were pressed under 35 tons for 10 minutes in a pressing machine, lubricant other than in concave portions was drained, a weight was measured by performing a basis weight process again, and the weight was divided by an examination area, thereby obtaining the retentation of oil.

Also, the galling properties were examined based on a repetitive friction coefficient and the number of repetitive frictions, at which a coating layer separates, during a repetitive friction test. The repetitive friction coefficient was represented as a friction coefficient value obtained after placing a surface of the hot-dip galvanized steel sheet having a length of 250 mm on a tip of a size of 25×35 mm under a weight of 6.1 MPa at a speed of 120 mm per second using a planar surface repetitive friction coefficient tester, which was performed 15 times.

Whether the galling occurs was examined by observing whether a coating layer was separated in each of the repeated repetitive friction tests using a scanning electron microscope (SEM).

The measurement results were listed in Table 1 below.

Meanwhile, as for image clarity after painting of each of the hot-dip galvanized steel sheets, a cupping test was performed on the hot-dip galvanized steel sheets to which a coating process was not performed such that a strain rate of a planar portion, a tested surface, reached 5% using a forming tester, and long-wavelength waviness (Wsa1-5) was measured. Whether orange peel was formed was examined by the naked eye, and the results were listed in Table 1.

In the cupping test, a diameter of a planar portion of a cup, strained to be planar, was controlled to be 100 mm at least, and a strain rate was adjusted by a processing height.

As for comparative examples 1 and 2 in which the skin-pass-rolling was performed using a TOPOCHROM texturing roll, average roughness of the roll was high, 2.8

TABLE 1

| | | | | | Properties of Plated Steel Sheet | | | | | | | | |
|---|---|---|---|---|---|---|---|---|---|---|---|---|---|
| | | Skin-Pass-Rolling Conditions | | | Surface Roughness | | Surface Form Factor | | Image Clarity Wsa1-5 | Whether | Repetitive | Whether | |
| Steel Type | Roll Type | Ra (μm) | RPc (count/cm) | Rsk | Roll Force (ton) | Ra (μm) | RPc (count/cm) | Rsk | V2 (nm²) | After Processing | Defect Occurred | Friction Coefficient | Galling Occurred | Note |
| 1 | TCT | 2.8 | 156 | 0.176 | 250 | 1.13 | 90 | −1.37 | 263 | 0.3 | x | 0.265 | ○ | Comparative Example 1 |
| 2 | TCT | 2.8 | 163 | 0.125 | 250 | 1.09 | 82 | −1.34 | 295 | 0.27 | x | 0.253 | ○ | Comparative Example 2 |
| 3 | EDT | 2.8 | 121 | 0.152 | 250 | 1.13 | 69 | −1.42 | 222 | 0.39 | ○ | 0.277 | ○ | Comparative Example 3 |
| 4 | EDT | 2.8 | 114 | 0.108 | 250 | 1.13 | 73 | −1.27 | 274 | 0.37 | ○ | 0.255 | ○ | Comparative Example 4 |
| 5 | EDT | 2.0 | 135 | 0.168 | 250 | 1.07 | 87 | −1.24 | 267 | 0.31 | x | 0.252 | ○ | Comparative Example 5 |
| 6 | EDT | 2.0 | 132 | 0.123 | 250 | 1.05 | 77 | −1.2 | 255 | 0.34 | x | 0.243 | ○ | Comparative Example 6 |
| 7 | EDT | 1.6 | 152 | 0.144 | 250 | 0.97 | 114 | −1.05 | 297 | 0.27 | x | 0.223 | ○ | Comparative Example 7 |
| 8 | EDT | 1.6 | 146 | 0.105 | 250 | 0.95 | 128 | −0.98 | 287 | 0.28 | x | 0.279 | ○ | Comparative Example 8 |
| 9 | SF | 2.8 | 135 | −0.524 | 250 | 1.41 | 70 | −0.33 | 415 | 0.38 | ○ | 0.189 | x | Comparative Example 9 |
| 10 | SF | 2.8 | 132 | −0.325 | 250 | 1.29 | 69 | −0.32 | 375 | 0.38 | ○ | 0.184 | x | Comparative Example 10 |
| 11 | SF | 2.8 | 137 | −0.224 | 250 | 1.35 | 73 | −0.28 | 408 | 0.37 | ○ | 0.179 | x | Comparative Example 11 |
| 12 | SF | 2.0 | 142 | −0.524 | 250 | 1.22 | 77 | −0.21 | 519 | 0.34 | x | 0.171 | x | Inventive Steel 1 |
| 13 | SF | 2.0 | 147 | −0.325 | 250 | 1.39 | 85 | −0.26 | 522 | 0.27 | x | 0.175 | x | Inventive Steel 2 |
| 14 | SF | 2.0 | 152 | −0.224 | 250 | 1.07 | 95 | −0.22 | 524 | 0.21 | x | 0.164 | x | Inventive Steel 3 |
| 15 | SF | 1.4 | 168 | −0.524 | 250 | 1.17 | 157 | −0.09 | 568 | 0.29 | x | 0.154 | x | Inventive Steel 4 |
| 16 | SF | 1.4 | 175 | −0.325 | 250 | 1.04 | 161 | 0.25 | 587 | 0.24 | x | 0.142 | x | Inventive Steel 5 |
| 17 | SF | 1.4 | 175 | −0.224 | 250 | 1.07 | 157 | 0.78 | 621 | 0.2 | x | 0.138 | x | Inventive Steel 6 |

(In Table 1, TCT is a TOPOCHROM texturing roll, EDT is an electrical discharge texturing roll, and SF is a roll of which roughness skewness was controlled by grinding peak portions.

In Table 1, "Whether Defect Occurred" relates to whether orange peel occurred, and when orange peel occurred, the sample was indicated as ○, and when orange peel did not occur, the sample was indicated as x. Also, in "Whether Galling Occurred," when the galling occurred, ○, and when the galling did not occur, x.)

As indicated in Table 1, as for inventive examples 1 to 6 in which the skin-pass-rolling was performed using a roll of which average roughness, roughness skewness, and the number of peaks in each unit length satisfied the conditions suggested in the present disclosure, roughness skewness (Rsk) and V2, form factors of the hot-dip galvanized steel sheet, were −0.3 or higher and 500 nm² or greater, respectively, a repetitive friction coefficient was 0.2 or lower, and the coating layer was not separated until the 15th repetitive friction test, and thus, the galling was excellent. Also, long-wavelength waviness (Wsa1-5) after 5%-cupping process of the hot-dip galvanized steel sheet was 0.35 μm or less, and long-wavelength waves such as orange peel did not occur with the naked eye, and thus, image clarity after painting was excellent.

μm, such that image clarity after painting was excellent, but the galling properties was significantly deteriorated.

As for comparative examples 3 and 4 using a roll having high average roughness of 2.8 μm among comparative examples 3 to 8 using an electrical discharge texturing roll, the galling properties and image clarity after painting of the hot-dip galvanized steel sheet were poor. As for comparative examples 5 to 8 using an electrical discharge texturing roll having low average roughness of 1.6 μm, RPc of the hot-dip galvanized steel sheet increased due to the degradation of roll roughness, and a long-wavelength waviness (Wsa1-5) value was low such that image clarity after painting was excellent, but roughness skewness (Rsk) of the hot-dip galvanized steel sheet was lower than −0.35, and V2 was less than 300 nm². Accordingly, a repetitive friction coefficient was 0.21 or higher, and the galling occurred due to the separation of a coating layer while performing 15 times of the repetitive friction tests.

As for comparative examples 9 to 11 in which the skin-pass-rolling was performed using a roll of which peak portions were ground, but of which average roughness was high as 2.8 μm, the galling properties were excellent, but long-wavelength waviness (Wsa1-5) was 0.35 μm or greater after a 5%-cupping process, and a long-wavelength defect such as orange peel occurred and was observed by the naked eye, and accordingly, image clarity after painting was deteriorated.

The invention claimed is:

1. A method of manufacturing a hot-dip galvanized steel sheet having excellent press formability and image clarity after painting, comprising:
   manufacturing a hot-dip galvanized steel sheet by hot-dip zinc coating a matrix steel sheet; and
   charging the hot-dip galvanized steel sheet in a skin-pass mill and skin-pass-rolling the hot-dip galvanized steel sheet,
   wherein the skin-pass-rolling uses a roll having roughness skewness (Rsk) of −0.2 or lower, average roughness (Ra) of 2 μm or less, excluding 0, and the number of peaks (RPc) in each unit length of 140 count/cm or higher.

2. The method of claim 1, wherein the skin-pass-rolled hot-dip galvanized steel sheet has surface long-wavelength waviness (Wsa1-5) of 0.35 μm or less, excluding 0, and the number of peaks (RPc) in each unit length of 75 count/cm or higher after processing at a strain rate of 5%.

* * * * *